United States Patent
Cooley

(10) Patent No.: US 10,526,958 B2
(45) Date of Patent: Jan. 7, 2020

(54) REVERSE OFFSET WASTEGATE VALVE ASSEMBLY FOR IMPROVED CATALYST LIGHT-OFF PERFORMANCE

(71) Applicant: BorgWarner Inc., Auburn Hills, MI (US)

(72) Inventor: Matthew B. Cooley, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 287 days.

(21) Appl. No.: 15/078,104

(22) Filed: Mar. 23, 2016

(65) Prior Publication Data

US 2017/0276064 A1   Sep. 28, 2017

(51) Int. Cl.
*F02B 37/18* (2006.01)
*F01D 5/02* (2006.01)
(Continued)

(52) U.S. Cl.
CPC .............. *F02B 37/186* (2013.01); *F01D 5/02* (2013.01); *F01D 17/105* (2013.01); *F01D 17/145* (2013.01); *F01D 25/24* (2013.01); *F02B 37/183* (2013.01); *F05D 2220/40* (2013.01); *Y02T 10/144* (2013.01)

(58) Field of Classification Search
CPC ...... F01D 17/105; F01D 17/145; F01D 25/24; F01D 5/02; F02B 37/186; F05D 2220/40
See application file for complete search history.

(56) References Cited

U.S. PATENT DOCUMENTS 3,166,094 A * 1/1965 Eagleton ................. F16L 55/46
137/268
3,942,551 A * 3/1976 Schuller .................. F16K 15/03
137/514
(Continued)

FOREIGN PATENT DOCUMENTS

DE   102011089777 A1   6/2013
DE   102012015536 A1   2/2014
(Continued)

OTHER PUBLICATIONS

International Search Report and Written Opinion; dated Aug. 21, 2017; for International Application No. PCT/US2017/023368; 17 pages.
(Continued)

*Primary Examiner* — Jesse S Bogue
(74) *Attorney, Agent, or Firm* — BrooksGroup

(57) ABSTRACT

A turbocharger assembly may include a turbine wheel. A turbine housing may surround at least part of the turbine wheel. A wastegate port may be defined by the turbine housing and may provide a bypass around the turbine wheel. A valve plate may be movable between a first position closing the wastegate port and a number of additional positions opening the wastegate port. The valve plate may have a face that faces the wastegate port. A shaft may be connected to the valve plate and may rotate about an axis at a pivot point. The pivot point may be located on an opposite side of a line from the valve plate, wherein the line may extend from the face and in a plane within which the face exists when the wastegate port is closed by the valve plate.

14 Claims, 2 Drawing Sheets

(51) Int. Cl.
*F01D 17/10* (2006.01)
*F01D 17/14* (2006.01)
*F01D 25/24* (2006.01)

(56) References Cited

U.S. PATENT DOCUMENTS

| | | | | |
|---|---|---|---|---|
| 4,188,973 | A * | 2/1980 | Weise | F16K 15/033 |
| | | | | 137/514 |
| 5,701,741 | A * | 12/1997 | Halsall | F02B 37/18 |
| | | | | 60/602 |
| 6,543,228 | B2 | 4/2003 | Deacon | |
| 7,600,380 | B2 | 10/2009 | Grissom et al. | |
| 8,191,368 | B2 | 6/2012 | Garrett et al. | |
| 8,205,448 | B2 * | 6/2012 | Koch | F01D 17/105 |
| | | | | 251/298 |
| 8,443,833 | B2 * | 5/2013 | Stradinger | F16K 15/03 |
| | | | | 137/514 |
| 8,490,387 | B2 | 7/2013 | Schreiber et al. | |
| 8,733,101 | B2 * | 5/2014 | Hoshi | F01D 17/105 |
| | | | | 251/299 |
| 8,820,709 | B2 | 9/2014 | Lombard et al. | |
| 9,145,827 | B2 | 9/2015 | Lueddecke et al. | |
| 2005/0178122 | A1 * | 8/2005 | Hastings | F02B 37/183 |
| | | | | 60/602 |
| 2006/0289072 | A1 * | 12/2006 | McMullen | F01D 17/105 |
| | | | | 137/601.01 |
| 2007/0257223 | A1 * | 11/2007 | van de Moosdijk | F16K 1/2028 |
| | | | | 251/300 |
| 2015/0040561 | A1 | 2/2015 | Matsui | |
| 2015/0125273 | A1 * | 5/2015 | Tschirschke | F01D 17/105 |
| | | | | 415/145 |
| 2015/0292395 | A1 * | 10/2015 | Dilalan | F16K 1/20 |
| | | | | 60/602 |
| 2017/0152793 | A1 * | 6/2017 | Albrecht | F01N 3/2006 |

FOREIGN PATENT DOCUMENTS

| | | |
|---|---|---|
| DE | 102012025367 A1 | 7/2014 |
| EP | 0078637 A1 | 5/1983 |
| EP | 1203872 A1 | 5/2002 |
| FR | 3018854 A3 | 9/2015 |
| WO | 2014099328 | 6/2014 |
| WO | 2014193779 A1 | 12/2014 |
| WO | 2015038414 A1 | 3/2015 |
| WO | 2015054180 A1 | 4/2015 |
| WO | 2016005370 A1 | 1/2016 |

OTHER PUBLICATIONS

Mack ; Date; Dec. 11, 2003 ; Wastegate Turbochargers-Description, Operation and Troubleshooting; Copyright Mack Trucks, Inc. 2003; 17 pages.
EPO Office Action dated Nov. 7, 2019; Application No. 17 715 578.5-1004 Applicant: BorgWarner Inc.; 4 pages.

* cited by examiner

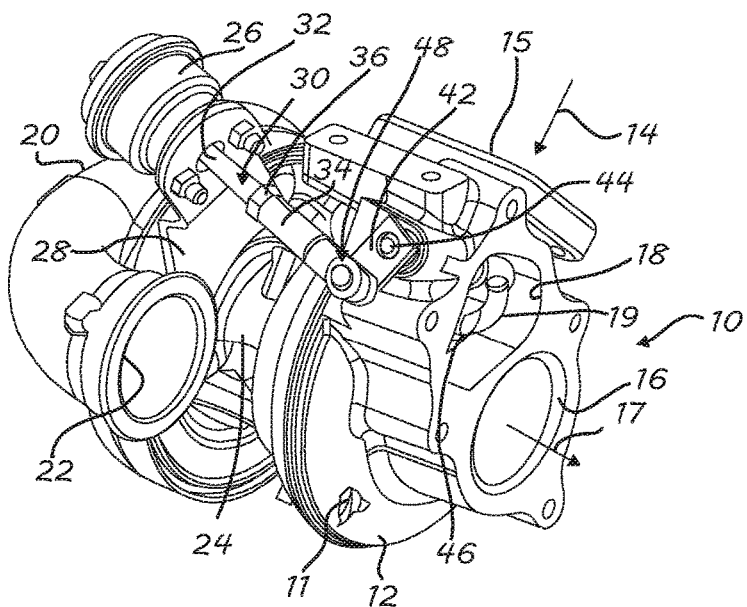
FIG. 1
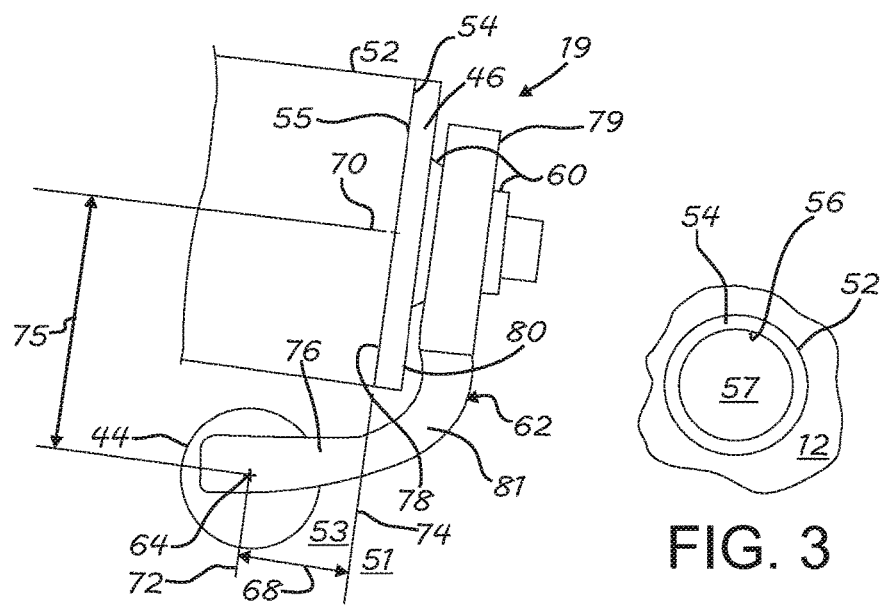
FIG. 2
FIG. 3

US 10,526,958 B2

REVERSE OFFSET WASTEGATE VALVE ASSEMBLY FOR IMPROVED CATALYST LIGHT-OFF PERFORMANCE

TECHNICAL FIELD

The field to which the disclosure generally relates includes turbochargers for use with internal combustion engines and more particularly, includes wastegate valves for turbochargers.

BACKGROUND

Turbochargers may be employed with internal combustion engines to pre-charge combustion air.

SUMMARY OF ILLUSTRATIVE VARIATIONS

A number of variations may involve a turbocharger assembly that may include a turbine wheel. A turbine housing may surround at least part of the turbine wheel. A wastegate port may be defined by the turbine housing and may provide a bypass around the turbine wheel. A valve plate may be movable between a first position closing the wastegate port and a number of additional positions opening the wastegate port. The valve plate may have a face that faces the wastegate port. A shaft may be connected to the valve plate and may rotate about an axis at a pivot point. The pivot point may be located on an opposite side of a line from the valve plate, wherein the line may extend from the face and in a plane within which the face exists when the wastegate port is closed by the valve plate.

Additional illustrative variations may involve a turbocharger assembly that may include a turbine wheel. A bypass may be defined around the turbine wheel. A surface may extend around and encircle the bypass. A valve assembly may selectively close the bypass. The valve assembly may include a face that mates with the surface. A forward area may be defined on the surface side of the face when the bypass is closed. The forward area may extend outward in a plane defined by the face. The face may rotate around an axis that may define a pivot point. The pivot point may be located in the forward area.

Other illustrative variations within the scope of the invention will become apparent from the detailed description provided herein. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 is a perspective illustration of part of a turbocharger system according to a number of variations.

FIG. 2 is a schematic illustration of a wastegate valve area of a turbocharger system with the valve closed according to a number of variations.

FIG. 3 is a schematic illustration of a wastegate port area of a turbocharger system with the valve open according to a number of variations.

DETAILED DESCRIPTION OF ILLUSTRATIVE VARIATIONS

Figure 4:
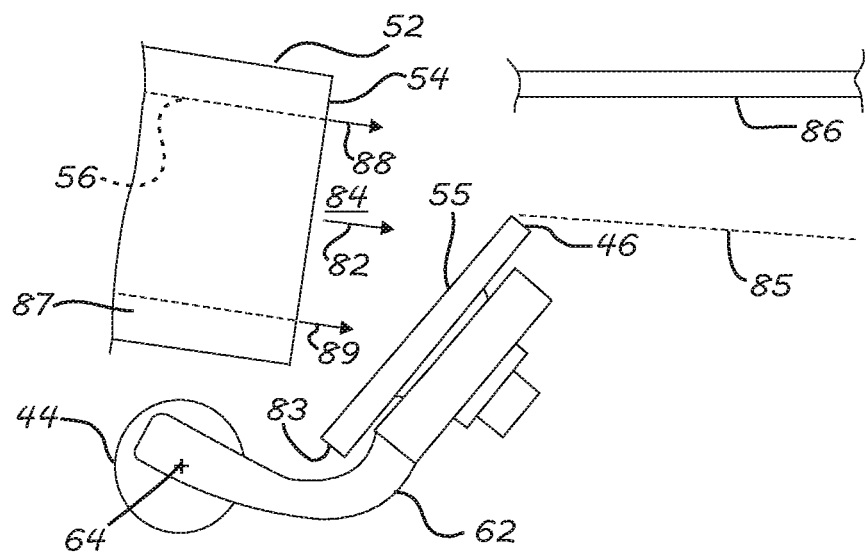
FIG. 4 is a schematic illustration of a wastegate valve area of a turbocharger system with the valve in an open position according to a number of variations.

The following description of the variations is merely illustrative in nature and is in no way intended to limit the scope of the invention, its application, or uses.

Part of a turbocharger system 10 is illustrated in FIG. 1 according to a number of variations. A turbine housing 12 may define an exhaust gas flow circuit for channeling the incoming exhaust gas 14. The exhaust gas 14 may be directed through an inlet 15 and at a turbine wheel inside the turbine housing 12 to induce rotation thereof. Part of the turbine housing 12 is shown broken away to reveal the turbine wheel 11. After being used to impart rotation to the turbine wheel 11, the exhaust gas may then be routed out of the turbine housing 12, through an outlet 16 which directs the outgoing exhaust gas 17 to an exhaust system that may be connected to the turbine housing 12. The inlet 15 may be surrounded by a flange for connection to an incoming exhaust conduit. The turbine housing 12 may also define an alternate exhaust gas flow path from the inlet 15 to another outlet 18, wherein the exhaust gas may bypass the turbine wheel 11. Flow to the outlet 18 may be controlled at a wastegate port by a valve assembly 19 that may be located inside the turbine housing 12. The waste gate port may allow for exhaust gas to bypass the turbine wheel 11 and instead to be delivered directly from the inlet 15 to the outlet 18 so that exhaust gas may flow downstream in the exhaust system. The wastegate port may be opened to limit exhaust gases going through the turbine thereby operating as a boost-controlling device. In a number of variations the outlets 16, 18 may not be separated, but instead may be combined in one opening for exhaust gas leaving the turbine housing 12, since both may lead to the same downstream exhaust conduit.

The turbocharger system 10 may also include a compressor housing 20 that may contain a compressor wheel that may be connected to the turbine wheel 11 by a shaft. The compressor housing 20 may be configured to collect air and gases from the compressor wheel and channel them through an outlet 22 and on to an engine intake system that may be connected to the outlet 22. The compressor housing 20 may be mounted to the turbine housing 12 by a central housing 24 that may support the shaft that connects the turbine wheel to the compressor wheel.

An actuator 26 may be mounted near the compressor housing 20, on a bracket 28. The actuator 26 may be operated through any of a number of mechanisms such as pneumatic including vacuum, electric, or other power sources. The bracket 28 may be connected to the central housing 24 or to the compressor housing 20. An arm 30 may extend from the actuator 26 toward the turbine housing 12. The arm 30 may include a first segment 32 and a second segment 34, with its length adjustable with a nut 36 to lock the length. The arm 30 may include an end opposite the actuator 26, with an opening through which a pin may extend forming a joint 48. The pin may be connected to a lever 42, which may be connected to a rotatable shaft 44. The shaft 44 may extend into the turbine housing 12 and may be connected to a valve plate 46 (shown in FIG. 2), of the valve assembly 19. As a result, translation of the arm 30 by the actuator 26 may rotate the lever 42 through the joint 48, thereby rotating the shaft 44 and the valve plate 46 to selectively open and close the wastegate port.

Vehicles with internal combustion engines, including those that employ turbochargers, may include an emissions system, which may be located downstream in the exhaust flow from the turbine housing 12. For emissions systems that use catalytic reactions, rapid warming following a cold start may be desirable for performance reasons. During a normal cold start, the emissions system is at ambient temperature and the engine exhaust may provide warming to a temperature at which catalyst reactions can occur. This warming period may be referred to as a light-off period. According to a number of variations, the valve assembly 19 may be used to open the wastegate port during cold starts to decrease catalytic converter light-off time. Allowing exhaust gas to bypass the turbine wheel 11 avoids heat loss to the turbine wheel 11 and its surrounding structures including of the turbine housing 12, maintaining a higher temperature in the exhaust gas stream 17 delivered downstream to the catalytic unit.

Referring to FIG. 2 the valve assembly 19 area is illustrated according to a number of variations. A section 52 of the turbine housing 12 may extend to a terminal surface 54. A view directed at the terminal surface 54 is shown in FIG. 3 with the valve assembly 19 open, and illustrates that the section 52 may define an opening referred to as wastegate port 56. The wastegate port 56 may be part of the exhaust gas bypass 57 around the turbine wheel 11. The terminal surface 54 may be flat and may be annular shaped and may encircle the wastegate port 56. In a number of variations the terminal surface 54 may include a countersunk portion (not illustrated), inside its rim for valve mating purposes, which may also be considered a terminal surface for mating. The valve assembly 19 may include the valve plate 46, which may have a face 55 that may mate with the terminal surface 54 as shown in FIG. 2 to close the wastegate port 56. The valve plate 46 may include an extension 60 that may be carried by an arm 62. The extension 60 and arm 62 may be configured to allow the valve plate 46 to pivot relative to the arm 62 for secure seating of the face 55 against the terminal surface 54. The arm 62 may extend to the shaft 44 and may be connected therewith.

In a number of variations the shaft 44 may rotate about an axis 64 that may be described as extending through the center of the shaft 44 along its length and directly into the view of FIG. 2. The axis 64 may extend perpendicular to the direction that the wastegate port 56 extends through the section 52, which is the same direction as the centerline 70 of the wastegate port 56. The axis 64 may be alternatively referred to as the pivot point of the valve plate 46, and may be offset on an opposite side of the terminal surface 54 from the valve plate 46. This pivot point and the axis 64 may be in a forward area 53 that may be defined on the surface 54 side of the face 55 when the bypass 57 is closed by the valve plate 46. The forward area 53 may exist across a plane defined by the face 55 from the valve plate 46, when closed. In describing this area a reference line 74 may be used and may exist in a plane defined by the mating surface 54 and face 55, and which may extend beyond the section 52 perpendicular to the centerline 70. The forward area 53 may be referred to as the area to the left of the reference line 74 and the mating elements 54, 55 in the perspective of FIG. 2. As viewed in FIG. 2, the rearward area 51 may be the area on the opposite side of the reference line 74 from the forward area 53 and may be defined as the area on the valve plate 46 side of the surface 54. This may be referred to as the area to the right of the reference line 74 and the mating elements 54, 55 in the perspective of FIG. 2. The face 55, along with the other moving parts of the valve assembly 19, may rotate around the axis 64 that defines the pivot point. The axis 64 and the pivot point may be located in the forward area 53. In a number of variations the axis 64 may be a distance 68 into the forward area from the reference line 74 to a reference line 72 that may extend from the axis 64 and parallel to the reference line 74. The distance 68 may be greater than zero and in a number of variations may place the entire shaft 44 in the forward area 53, and which may provide desirable motion of the valve plate 46. In addition, the shaft 44 may be positioned near or adjacent the section 52 defining the wastegate port 56. This positioning may result in a minimum force vector on the shaft 44 when closing the valve plate 46 into the exhaust gas stream exiting the wastegate port 56, by minimizing the distance from the axis 64 to the point at which the centerline 70 crosses the face 55. When the wastegate port 56 is closed, the terminal surface 54 and the mating part of the face 55 may be considered as effectively occupying the same structural space. The entire shaft 44 may be located forward of the face 55 and on an opposite side of the terminal surface 54 from the valve plate 46, and in other words, across the reference line 74 from the terminal surface 54 and in the forward area 53. Offsetting the pivot point in front of the face 55 is accomplished by the structural shape of the arm 62 which may be comprised of a number of segments 76, 81 and 79. The segment 76 may extend from the shaft 44 beginning at a position forward of the face side 78 of the valve plate 46 and in the forward area 53, to a position rearward of the back side 80 of the valve plate 46 and in the rearward area 51. Because of the location of the pivot point in the forward area 53, the valve plate 46 may immediately begin moving downward in the perspective of FIG. 2, when the wastegate port 56 is initially opened by rotation of the shaft 44 to the position of FIG. 4. The arm 62 may also include a segment 79 that engages the extension 60 and supports the valve plate 46. The segment 79 may be disposed at an obtuse angle relative to the segment 76 by means of the curved intermediate segment 81. As viewed in FIG. 2 the axis 64 and the pivot point may be located outside the flow path through the wastegate port 56, and may be located at a distance 75 from the centerline 70 and outside the outermost perimeter of the valve plate 46 away from the centerline 70, and outside the wall 87 shown in FIG. 4), of the section 52, through which the flow path is defined.

Figure 5:
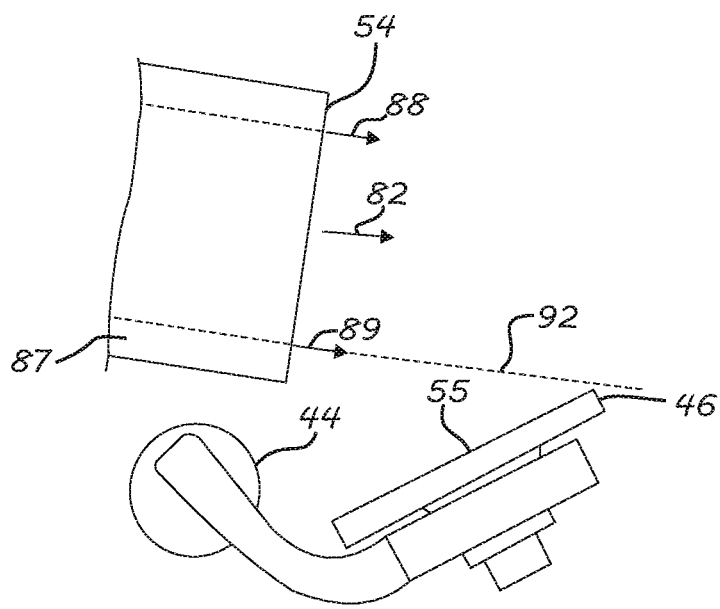
FIG. 5 is a schematic illustration of a wastegate valve area of a turbocharger system with the valve in an open position according to a number of variations.

In a number of variations, the location of the pivot point at the axis 64 results in advantageous movement of the valve plate 46 off the terminal surface 54 as the shaft rotates to open the wastegate port 56 as shown in FIG. 4. The edge of the valve plate 46 at a point 83, that is the part of the valve plate 46 nearest the segment 81 of the arm 62, moves out of the flow 82 of exhaust gas leaving the wastegate port (downward as illustrated in FIG. 4), and away from the surface 54. As the shaft 44 is rotated further to open the wastegate port 56, an increasing amount of the valve plate 46 moves out of the path of the flow 82. A curtain area 84 may be the flow area opened by the valve plate 46 between the reference lines 88 and 89, and may be the amount of area available for flow out of the wastegate port 56. The oncoming flow 82 leaving the wastegate port 56 may be diverted around the valve plate 46 and may be contained by a conduit wall 86, such as of the turbine housing 12. The downstream flow may be substantially channeled to such as within the reference line 85 and the opposite the wall 86. The flow area may immediately increase in size as the valve plate 46 lifts off the terminal surface 54. The location of the pivot point of the shaft 44 forward of the face 55 may maximize the expansion rate of the unobstructed flow area as the wastegate is opened. Maximizing expansion may result in less flow obstruction by the valve plate 46 and may minimize light-off time of a downstream catalyst during cold starts. As the shaft 44 is further rotated the amount to which the flow 82 is obstructed by the valve plate 46 is further reduced as shown in FIG. 5. The valve plate 46 may completely move out of the curtain area 84 with minimal rotation of the shaft 44 (clockwise as viewed in FIG. 5). As shown, the obstructed area may be eliminated as flow is free within the reference line 92 extending from the inside of the bottom part of the wall 87. Due to the opening action, the effect on flow vectors may be minimized and may lead to maximized direct impingement of exhaust gas flow on the catalyst face, which may further minimize catalyst light-off times. This may especially be the case in systems where the catalyst unit is closely or directly coupled with the turbine housing 12.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a turbocharger assembly that may include a turbine wheel. A turbine housing may surround at least part of the turbine wheel. A wastegate port may be defined by the turbine housing and may provide a bypass around the turbine wheel. A valve plate may be movable between a first position closing the wastegate port and a number of additional positions opening the wastegate port. The valve plate may have a face that faces the wastegate port. A shaft may be connected to the valve plate and may rotate about an axis at a pivot point. The pivot point may be located on an opposite side of a line from the valve plate, wherein the line may extend from the face and in a plane within which the face exists when the wastegate port is closed by the valve plate.

Variation 2 may include the turbocharger assembly according to variation 1 and may include an arm that may extend from the shaft to the valve plate.

Variation 3 may include the turbocharger assembly according to variation 2 wherein the valve plate may include an extension engaged with the arm.

Variation 4 may include the turbocharger assembly according to variation 3 wherein the arm may include a first segment that may extend from the shaft at a position forward of the face, to a position rearward of the face on a back side of the valve plate. The arm may include a second segment that may engage the extension and may support the valve plate.

Variation 5 may include the turbocharger assembly according to any of variations 1-4 wherein the pivot point may be located along a line that extends from a center point of the valve plate and that may be oriented forward of the face.

Variation 6 may include the turbocharger assembly according to any of variations 1-5 wherein the wastegate port may be defined in a section of the turbine housing that may have a terminal surface that is flat and annular in shape and through which the wastegate port may be defined. The valve plate may mate against the terminal surface when in the first position.

Variation 7 may include the turbocharger assembly according to any of variations 1-6 wherein the shaft, in its entirety, may be located forward of the face and on the opposite side of the line.

Variation 8 may include the turbocharger assembly according to any of variations 1-7 wherein a flow path may be defined through the wastegate port and wherein upon opening to the number of additional positions the valve plate may immediately begin moving out of the flow path.

Variation 9 may include the turbocharger assembly according to any of variations 1-8 wherein the pivot point may be located outside a flow path defined through the wastegate port.

Variation 10 may involve may involve a turbocharger assembly that may include a turbine wheel. A bypass may be defined around the turbine wheel. A surface may extend around and may encircle the bypass. A valve assembly may selectively close the bypass. The valve assembly may include a face that mates with the surface. A forward area may be defined on the surface side of the face when the bypass is closed. The forward area may extend outward in a plane defined by the face. The face may rotate around an axis that may define a pivot point. The pivot point may be located in the forward area.

Variation 11 may include the turbocharger assembly according to variation 10 and may include a turbine housing surrounding the turbine wheel and defining an inlet and an outlet. The outlet may be part of the bypass and may include a terminal surface with which the face may mate. The entire terminal surface may be located at the plane.

Variation 12 may include the turbocharger assembly according to variation 10 or 11 and may include a shaft that may rotate around the axis and to which the face may be connected. The entire shaft may be located in the forward area.

Variation 13 may include the turbocharger assembly according to variation 12 and may include a valve plate that may define the face. The valve plate may be connected with the shaft by an arm that may include a first segment that may extend from the forward area to a position on an opposite side of the face from the forward area. The arm may include a second segment that may engage and may support the valve plate.

Variation 14 may include the turbocharger assembly according to any of variations 10-13 wherein the pivot point may be located along a line that may extend from a center point of the face and that may be oriented in the forward area.

Variation 15 may include the turbocharger assembly according to any of variation 10-14 wherein an exhaust gas may flow in a flow path through the bypass and out of the wastegate port when the face is unseated from the surface. A part of the face may be moved out of the flow path whenever the face is unseated.

The above description of select variations within the scope of the invention is merely illustrative in nature and, thus, variations or variants thereof are not to be regarded as a departure from the spirit and scope of the invention.

What is claimed is:

1. A turbocharger assembly comprising: a turbine wheel, a turbine housing surrounding at least part of the turbine wheel, a wastegate port defined by the turbine housing and providing a bypass around the turbine wheel, a valve plate movable between a first position closing the wastegate port and a number of additional positions opening the wastegate port, the valve plate having a face that lies entirely on a single plane and that faces the wastegate port such that the entire face of the valve plate facing the wastegate port when closed is a flat face lying in the single plane, a shaft that rotates about an axis at a pivot point and is connected to an arm near a first free end offset from the pivot point and wherein the valve plate is connected to the arm at a second end, the pivot point located on an opposite side of a line from the valve plate, wherein the line extends from the face and in the single plane within which the face exists when the wastegate port is closed by the valve plate, the turbine housing having a section including a cylindrical wall defining the waste port, and wherein the rotation of the shaft causes the valve plate to move to a position wherein the waste port is unobstructed by the valve plate and so that a reference line extending from an inside of a first part of the wall and a reference line extending from an inside of a second part of the wall, opposite the inside of the first part of the wall, do not intersect the face of the valve plate, and the shaft is adjacent the cylindrical wall.

2. The turbocharger assembly according to claim 1 wherein the wastegate port is defined in a section of the turbine housing that has a terminal surface that is flat and annular in shape and through which the wastegate port is defined, wherein the valve plate mates against the terminal surface when in the first position.

3. The turbocharger assembly according to claim 1 wherein the shaft, in its entirety, is located forward of the face and on the opposite side of the line.

4. The turbocharger assembly according to claim 1 wherein a flow path is defined through the wastegate port and wherein upon opening to the number of additional positions the valve plate immediately begins moving out of the flow path.

5. The turbocharger assembly according to claim 1 wherein the pivot point is located outside a flow path defined through the wastegate port.

6. The turbocharger assembly according to claim 1 wherein the valve plate includes an extension from a back side of the valve plate and further comprising an arm extending from the shaft to the valve plate, wherein the includes a first segment extending from the shaft at a position forward of the face to a position rearward of the face on the back side of the valve plate, and further includes a second segment that engages a side of the extension perpendicular to the face and supports the valve plate via the second segment.

7. A turbocharger assembly comprising a turbine wheel, a bypass defined around the turbine wheel, a surface extending around and encircling the bypass, and a valve assembly closing the bypass wherein the valve assembly includes a face that lies entirely on a single plane and that mates with the surface such that the entire face of the valve assembly facing the bypass when closed is a flat face lying in the single plane, and wherein a forward area is defined on the surface side of the face when the bypass is closed the forward area extending outward from the single plane, the face rotating around an axis that defines a pivot point, the pivot point located in the forward area, the valve assembly having a valve plate having the face, a shaft that rotates about an axis at a pivot point and is connected to an arm near a first free end offset from the pivot point and wherein the valve plate is connected to the arm at a second end, the turbine housing having a section including a cylindrical wall defining the waste port, and wherein the valve plate is moveable to a position wherein the waste port is unobstructed by the valve plate and so that a reference line extending from an inside of a bottom part of the wall and a reference line extending from an inside of a top part of the wall, opposite the inside of the bottom part of the wall, do not intersect the face of the valve plate, and the shaft is adjacent the cylindrical wall.

8. The turbocharger assembly according to claim 7 further comprising a turbine housing surrounding the turbine wheel and defining an inlet and an outlet wherein the outlet is part of the bypass and includes a terminal surface with which the face mates, the entire terminal surface located at the plane.

9. The turbocharger assembly according to claim 7 wherein the entire shaft rotates around the axis and is located in the forward area.

10. The turbocharger assembly according to claim 7 wherein the pivot point is located along a line that extends from a center point of the face and that is oriented in the forward area.

11. The turbocharger assembly according to claim 7 wherein an exhaust gas flows in a flow path through the bypass and out of the wastegate port when the face is unseated from the surface, and wherein a part of the face is moved out of the flow path whenever the face is unseated.

12. The turbocharger assembly according to claim 7 wherein the valve assembly comprises a valve plate having a circumference and a shaft that engages the valve plate via an arm including a first segment extending from the shaft at a position forward of the face to a position rearward of the face, and further including a second segment that engages a side of the valve plate at a circumferential edge of the valve plate and supports the valve plate via the second segment.

13. A turbocharger assembly comprising: a turbine wheel, a turbine housing surrounding at least part of the turbine wheel, a wastegate port defined by the turbine housing and providing a bypass around the turbine wheel, a valve plate movable between a first position closing the wastegate port and a number of additional positions opening the wastegate port, the valve plate having a face that lies entirely on a single plane and that faces the wastegate port such that the entire face of the valve plate facing the wastegate port when closed is a flat face lying in the single plane, a shaft that rotates about an axis at a pivot point and is connected to an arm near a first free end offset from the pivot point and wherein the valve plate is connected to the arm at a second end, the pivot point located on an opposite side of a line from the valve plate, wherein the line extends from the face and in the single plane within which the face exists when the wastegate port is closed by the valve plate, the turbine housing having a section including a cylindrical wall defining the waste port, and wherein the rotation of the shaft causes the valve plate to move to a position wherein the waste port is unobstructed by the valve plate and so that an imaginary cylinder extending from the inside of the wall does not intersect the face of the valve plate, and the shaft is adjacent the cylindrical wall.

14. A turbocharger assembly comprising a turbine wheel, a bypass defined around the turbine wheel, a surface extending around and encircling the bypass, and a valve assembly closing the bypass wherein the valve assembly includes a face that lies entirely on a single plane and that mates with the surface such that the entire face of the valve assembly facing the bypass when closed is a flat face lying in the single plane, and wherein a forward area is defined on the surface side of the face when the bypass is closed the forward area extending outward from the single plane, the face rotating around an axis that defines a pivot point, the pivot point located in the forward area, the valve assembly having a valve plate having the face, a shaft that rotates about an axis at a pivot point and is connected to an arm near a first free end offset from the pivot point and wherein the valve plate is connected to the arm at a second end, the turbine housing having a section including a cylindrical wall defining the waste port, and wherein the valve plate is moveable to a position wherein the waste port is unobstructed by the valve plate and an imaginary cylinder extending from the inside of the wall does not intersect the face of the valve plate, and the shaft is adjacent the cylindrical wall.

\* \* \* \* \*